3,067,038
EDIBLE COMPOSITIONS COMPRISING OIL-IN-WATER EMULSIONS

John J. O'Connell, San Diego County, Calif., assignor to Keico Company, San Diego, Calif., a corporation of Delaware
No Drawing. Filed Mar. 1, 1960, Ser. No. 12,002
7 Claims. (Cl. 99—144)

This invention relates to edible compositions comprising oil-in-water emulsions containing a small amount of a Xanthomonas hydrophilic colloid.

The invention relates particularly to the production of edible emulsions in which an oily liquid or semi-liquid is a dispersed phase and an aqueous liquid the continuous phase. The word "edible" as used herein includes edible emulsions such as dressings for foods, for example, salad dressings, French dressings, and the like, as well as other emulsions suitable for human consumption, such as pharmaceutical emulsions. The said pharmaceutical emulsions include, for example, the nutrient-type vegetable oil-in-water emulsions, laxative mineral oil emulsions, emulsified oils containing suspended vitamins and cod liver oil emulsions.

In preparing edible emulsion products as aforesaid, it is important that they be so prepared that the water and oil phases are extremely resistant to separation, bleeding, syneresis and cracking. It is also desirable that the said products, particularly those used as dressings for food, be stabilized by means that do not impair flavor release. It will be appreciated that the ingredients in such dressings may include salt, sugar, dextrose, corn syrup, invert sugar syrup, nondiastatic maltose syrup, glucose syrup, honey, mustard, paprika, spices, spice oils, spice extracts, monosodium glutamate, tomato paste, tomato puree, catsup, sherry wine, vinegar, used either alone or diluted with water as the water phase in such emulsions, citric acid, lemon juice, lime juice, egg yolks and still other materials used as seasonings and flavorings.

It will be appreciated by those skilled in the art of working with edible emulsions that a good stabilizer for the said emulsions should be substantially tasteless and have the property of preventing the oil and water phases in such emulsions from separating without at the same time increasing the viscosity to the point where pouring is impaired.

It is an object of this invention to provide means for stabilizing edible oil-in-water emulsions.

It is a still further object of this invention to provide new and useful edible oil-in-water compositions having good shelf-life characteristics.

It is a further object of this invention to provide new and useful suitable oil-in-water dressings for foods having desirable taste characteristics.

It is a further object of this invention to provide new and useful edible stabilized oil-in-water emulsions having improved resistance to oil and water separation upon exposure to freezing and thawing.

In keeping with my invention I have discovered that highly satisfactory edible emulsified oil-in-water compositions may be prepared by including in the formulation a Xanthomonas hydrophilic colloid, and particularly a hydrophilic colloid produced by the bacterium Xanthomonas campestris. In keeping with my discovery I have found that this material is surprisingly effective as a stabilizer for edible oil-in-water emulsions in concentrations of a relatively low level compared with established stabilizers and yet the resulting product has remarkably good stability against separation.

I have further discovered that a Xanthomonas colloid, when included in the formulation of a salad dressing of the kind usually including starch, makes it possible to reduce the starch contained and to prepare the dressing without the need for cooking. A dressing so prepared has been found to have excellent resistance to bleeding, cracking, syneresis, separation and is relatively stable to separation on freezing and thawing. Still further, the consistency of the dressing so prepared is pleasing and the flavor release very good.

I have further discovered that a Xanthomonas colloid, when included in a non-starch dressing for salads, provides the dressing with the pleasing body and stability normally associated with dressings containing starch. Unlike the dressings containing starch, a dressing so made in accordance with my invention does not require cooking during preparation.

To further illustrate my invention, I prepared dressings of the pourable, flavored, emulsified type known as Thousand Island, bleu cheese and Roquefort cheese dressings. These dressings so prepared with a Xanthomonas hydrophilic colloid had good stability on standing, and the taste characteristics thereof were unimpaired by the addition of the said Xanthomonas colloid.

The amounts in an edible oil-in-water emulsion are relatively small and depend upon the character of the emulsion, such as for the relative quantities of oil and water as well as the other ingredients of the composition. Normally, an amount of from about 0.05 to 0.7 percent by weight of the oil and water used in the emulsion of the said Xanthomonas colloid should be used.

A Xanthomonas hydrophilic colloid that is particularly suitable for use in accordance with my invention is such a colloid prepared by the bacterium Xanthomonas campestris. The said colloid is a polymer containing mannose, glucose, potassium glucuronate and acetyl in the approximate molar ratio of 2:1:1:1. In such a colloid, the potassium portion can be replaced by several other cations without substantial change in the property of the said material for my purpose. The said colloid, which is a high molecular weight, exocellular material, may be prepared by the bacterium, Xanthomonas campestris, by whole culture fermentation of a medium containing 2–5 percent commercial glucose, organic nitrogen source, dipotassium hydrogen phosphate and appropriate trace elements. The incubation time is approximately 96 hours at 28° C., aerobic conditions. In preparing the colloid as aforesaid, it is convenient to use corn steep liquor or distillers' dry solubles as an organic nitrogen source. It is expedient to grow the culture in two intermediate stages prior to the final inoculation in order to encourage vigorous growth of the bacteria. These stages may be carried out in media having a pH of about 7. In a first stage a transfer from an agar slant to a dilute glucose broth may be made and the bacteria cultured for 24 hours under vigorous agitation and aeration at a temperature of about 30° C. The culture so produced may then be used to inoculate a higher glucose (3%) content broth of larger volume in a second intermediate stage. In this stage the reaction may be permitted to continue for 24 hours under the same conditions as the first stage. The culture so acclimated for use with glucose by the aforementioned first and second stages is then added to the final glucose medium. In the aforesaid method of preparing *Xanthomonas campestris* hydrophilic colloid, a loopful of organism from the agar slant is adequate for the first stage comprising 200 milliliters of the said glucose media. In the second stage the material resulting from the first stage may be used together with 9 times its volume of a 3% glucose media. In the final stage the material produced in the second stage may be admixed with 19 times its volume of the final media. A good final media may contain 3% glucose, 0.5% distillers' dry solubles, 0.5% dipotassium phosphate, 0.1% magnesium sulphate having 7 molecules of water of crystallization and water. The reaction in the final stage may be satisfactorily carried out for 96 hours at 30° C. with vigorous agitation and aeration. The resulting *Xanthomonas campestris* colloidal material which I have found to be suitable for my purpose can be recovered by precipitation in methanol of the clarified mixture from the fermentation.

In the following I have set forth examples of specific embodiments of my invention as a means of illustrating the utility thereof:

*Example I.—French Dressing*

To 158 parts of water add a dry mixture of 40 parts of sugar and 2 parts of a Xanthomonas colloid prepared as aforesaid. When all is dissolved, add 80 parts of sugar, 40 parts of salt, 15 parts of paprika and 5 parts of mustard. After a short mixing time add 160 parts of 60 grain vinegar and 100 parts of lemon juice. Mix for several minutes and then add 50 parts of tomato paste. When well blended slowly add 350 parts of corn oil, mix 5 minutes and pass the mix through a Gaulin colloid mill at a 0.015 inch clearance setting. Bottle the resulting product.

In a trial by this procedure the resulting dressing was an excellent, smooth pouring material with very good flavor release. The viscosity was approximately 1400 cps. In a 30 day accelerated test at 115° F. the dressing showed no separation.

*Example II.—Salad Dressing*

To 40 parts of sugar, add 20 parts of instant starch and 5 parts of a Xanthomonas colloid prepared as aforesaid. Dry blend and then disperse in 410 parts of water. Mix until dissolved and add 60 parts of sugar. Then mix in 20 parts of salt, 5 parts of mustard and 40 parts of fresh egg yolks. Using a fast whip beater mix in 300 parts of corn oil and 100 parts of 100 grain vinegar. Bottle the resulting product.

In a trial by this procedure the resulting dressing had a smooth, semi-solid consistency measuring 8000 cps. on a model LVF Brookfield viscometer using a No. 4 spindle at 60 r.p.m. It showed excellent flavor release, and resistance to bleeding, cracking, syneresis and separation. Resistance to separation due to freezing and thawing was improved.

*Example III.—Non-Starch Dressing*

To 40 parts of sugar, add 5 parts of a Xanthomonas colloid prepared as aforesaid. Dry blend and then disperse in 410 parts of water. Mix until dissolved and add 60 parts of sugar. Then mix in 20 parts of salt, 5 parts of mustard and 40 parts of fresh egg yolks. Using a fast whip beater mix in 300 parts of corn oil and 100 parts of 100 grain vinegar and pass the mix through a Gaulin colloid mill at a 0.015 inch clearance setting. Bottle the resulting product.

In a trial by this procedure the resulting dressing had a smooth, semi-solid consistency measuring 3400 cps. on a model LVF Brookfield viscometer using a No. 4 spindle at 60 r.p.m. It showed excellent flavor release, and resistance to bleeding, cracking, syneresis and separation. Resistance to separation due to freezing and thawing was improved.

*Example IV.—Cheese Dressing*

To 40 parts of sugar, add 20 parts of instant starch, 2 parts of a Xanthomonas colloid prepared as aforesaid, and add 70 parts of bleu cheese. Dry blend and then disperse in 410 parts of water. Mix until dissolved and add 60 parts of sugar. Then mix in 20 parts of salt, 5 parts of mustard and 40 parts of fresh egg yolks. Using a fast whip beater mix in 300 parts of corn oil and 100 parts of 100 grain vinegar. Bottle the resulting product.

In a trial by this procedure the resulting dressing had a smooth, semi-solid consistency measuring 1600 cps. on a model LVF Brookfield viscometer using a No. 4 spindle at 60 r.p.m. It showed excellent flavor release, and resistance to bleeding, crackin, syneresis, and separation. Resistance to separation due to freezing and thawing was improved.

*Example V.—Flavor Oil Emulsion*

Dissolve 0.4 part of Xanthomonas hydrophilic colloid in 80 parts of water. To this add 0.2 part of Methyl Parasept, 10 parts of glycerine and coloring dye to suit. Disperse 10 parts of U.S.P. lemon oil in the mix and pass it through a Gaulin colloid mill at 0.015 inch clearance setting.

In a trial by this formula a product was made which had a viscosity of 380 centipoises. After one month the viscosity was essentially unchanged and the emulsion intact.

*Example VI.—Mineral Oil Emulsion*

Dissolve 0.5 part of Xanthomonas hydrophilic colloid in 50 parts of water. To this add one part of Tween 80 and 0.1 part of Methyl Parasept. Disperse 50 parts of U.S.P. mineral oil into the mix and homogenize the emulsion.

By this formulation a stable emulsion was produced having 2600 centipoises.

It will be understood that while there have been described herein certain specific embodiments of this invention, it is not intended thereby to have it limited to or circumscribed by the specific details given in view of the fact that this invention is susceptible of various modifications and changes which come within the spirit and scope of this disclosure and of the appended claims.

What is claimed is:

1. A new and useful edible oil-in-water emulsion composition comprising an aqueous fluid, an oily substance and from .05 to .7 percent by weight of said aqueous fluid and oily substance in said emulsion of a *Xanthomonas campestris* hydrophilic colloid.

2. An emulsified dressing for food having a continuous aqueous phase and a dispersed oily phase, and from .05 to .7 percent by weight of the aqueous phase and dispersed oily phase in said emulsified dressing of a *Xanthomonas campestris* hydrophilic colloid.

3. A highly stable edible oil-in-water emulsion containing from .05 to .7 percent by weight of the oil and water in said emulsion of a *Xanthomonas campestris* hydrophilic colloid.

4. An emulsion consisting substantially of an edible oil intimately dispersed throughout an aqueous liquid, said emulsion containing a *Xanthomonas campestris* hydrophilic colloid in an amount sufficient to stabilize the said emulsion.

5. A French dressing consisting substantially of an edible oil intimately dispersed throughout an aqueous phase containing vinegar, salt, sugar and a minor quantity of a *Xanthomonas campestris* hydrophilic colloid in an amount sufficient to keep said edible oil dispersed in said aqueous phase.

6. A salad dressing composed substantially of an edible oil, vinegar, egg, salt and water in the form of an emulsion having a continuous aqueous phase, said emulsion containing a *Xanthomonas campestris* hydrophilic colloid in an amount sufficient to act as a stabilizing agent for said salad dressing.

7. A flavoring emulsion consisting substantially of a water-insoluble substance having flavor-imparting properties, intimately dispersed throughout an aqueous liquid containing a *Xanthomonas campestris* hydrophilic colloid in an amount sufficient to act as a stabilizing agent for said flavoring emulsion.

References Cited in the file of this patent

UNITED STATES PATENTS

| | | |
|---|---|---|
| 1,625,641 | Douglas et al. | Apr. 19, 1927 |
| 2,344,688 | Folkrod | Mar. 21, 1944 |
| 2,824,092 | Thompson | Feb. 18, 1958 |
| 3,000,790 | Jeanes et al. | Sept. 19, 1961 |

OTHER REFERENCES

Prescott et al.: "Industrial Microbiology," 3rd ed., McGraw-Hill Publishers, 1959, pp. 504 and 505.